United States Patent [19]
Ohashi et al.

[11] Patent Number: 6,042,476
[45] Date of Patent: Mar. 28, 2000

[54] COMMUNICATIONS CONTROL SYSTEM, COMMUNICATIONS CONTROL DEVICE, GAME DEVICE AND RECORDING MEDIUM

[75] Inventors: Osamu Ohashi; Susumu Ise, both of Tokyo, Japan

[73] Assignee: Kabushiki Kaisha Sega Enterprises, Tokyo, Japan

[21] Appl. No.: 08/986,107

[22] Filed: Dec. 5, 1997

[30] Foreign Application Priority Data

Dec. 5, 1996 [JP] Japan .................................. 8-325257

[51] Int. Cl.⁷ ........................................................ A63F 9/22
[52] U.S. Cl. .................. 463/40; 463/42; 463/30
[58] Field of Search ........................... 463/40–43, 36–39, 463/30–34

[56] References Cited

U.S. PATENT DOCUMENTS

5,685,775  11/1997  Bakoglu et al. ............................ 463/41
5,894,556  4/1999  Grimm et al. .............................. 463/40

*Primary Examiner*—Jessica J. Harrison
*Assistant Examiner*—Sheila Clayton
*Attorney, Agent, or Firm*—Morrison & Foerster LLP

[57] ABSTRACT

In a communications control system which conducts communications 200 between a plurality of communications control devices, one of the plurality of communications control devices A, B forming a master device A has the right to determine environmental conditions in preference to the other communications control device B. The slave communications control device B is able to transmit the environmental conditions desired by the user of that device to the master communications control device A, and the environmental conditions determined by the master communications control device A are set as the environmental conditions for the slave device, regardless of whether or not these coincide with the environmental conditions desired by the user of the slave device. It is possible to provide communications control technology whereby, if there exist environmental conditions which affect both communications control devices jointly, these conditions can be determined in a rational manner.

11 Claims, 6 Drawing Sheets

COMMUNICATIONS CONTROL SYSTEM, COMMUNICATIONS CONTROL DEVICE, GAME DEVICE AND RECORDING MEDIUM

BACKGROUND OF THE INVENTION

1. Field of the Inventional

The present invention relates to a communications control system involving, for instance, game devices which communicate by means of a communications circuit, and more particularly, to technology for determining environmental conditions between communications control devices.

2. Description of the Related Art

When conducting a game or simulation in a computer device or video game device, the device is generally used independently. However, systems have been proposed for implementing games or simulations between remotely located devices by connecting computer devices or game devices which are in mutually separate locations by means of a communications circuit, such as a telephone network.

In a system of this kind, operating data, or the like, from each device is transmitted and received reciprocally via the communications circuit, and this data is used to affect the processing of each device. Thereby, the users operating the devices can control the devices exactly as though processing is conducted in a single device to which two operating means are directly connected.

When conducting the same simulation or game in the remotely located computer devices or game devices, in some cases, the environmental conditions must be the same in both devices. Here, the "environmental conditions" refers to conditions which may cause compatibility errors, or unfairness between the devices, if they not put to the same settings. In a driving game, for instance, this may include the type of course or the weather during racing.

In this case, if only one of the game devices connected by the communications circuit has the right to determine the environmental conditions, and the other device cannot participate in determining the conditions, then the person playing on the device which cannot participate will lose interest. On the other hand, if both devices are capable of determining the conditions, then where there is a conflict of opinions between the players operating the two devices, for an indeterminate period of time it will be impossible to determine the environmental conditions. If this decision process takes a long time, then the circuit charges will rise.

SUMMARY OF THE INVENTION

Therefore, it is an object of the present invention to provide communications control technology whereby, when there exist environmental conditions which affect the operation of all communications control devices equally, these conditions can be determined rationally.

A first object of the present invention is to provide communications control technology whereby an environment is set according to whether or not a communications control device has a right to determine the environment, and a communications control device which does not have this right is able to transmit a desired environment to the communications control device which does have this right.

A second object of the present invention is to provide a communications control device capable of displaying an environment desired by the user of that device, even if the communications control device does not have the right to determine the environment.

A third object of the present invention is to provide a communications control device capable of displaying an environment desired by the user of that device, even if the communications control device does not have the right to determine the environment, and also displaying the environment transmitted by the communications control device having the right to determine the environment.

A fourth object of the present invention is to provide a communications control device capable of resuming processing when a long time is required to determine the environment.

A fifth object of the present invention is to provide a communications control device whereby any sense of unfairness can be eliminated by changing processing according to whether or not the communications control device which has the right to determine the environment has accepted the environment desired by other communications control devices.

In a communications control system for conducting communications between a plurality of communications control devices, the invention for achieving the first object comprises:(a) a master communications control device which has the right to determine environmental conditions affecting the operations of all the communications control devices jointly, in preference to the other communications control devices, in accordance with the actions of a user operating this master communications control device, and which displays the environmental conditions transmitted by the other communications control devices to the user for his or her information; and (b) a slave communications control device, which communicates with the master communications control device, transmits environmental conditions reflecting the individual preferences of the user operating that slave communications control device in accordance with that user's actions, to the master communications control device, and sets the environmental conditions determined by the master communications control device as its own environmental conditions, regardless of whether or not the environmental conditions determined by the master communications control device in accordance with the actions of its user coincide with the environmental conditions reflecting the individual preferences of the user operating this slave communications control device.

It is desirable if only one of the plurality of communications control devices, such as game device or simulation devices, has the right to determine the final environmental conditions.

Furthermore, in a communications control device which communicates with other communications control devices, the present invention comprises: (a) means for determining whether or not the communications control device has the right to determine environmental conditions affecting all the communications control devices jointly, in preference to the other communications control devices, on the basis of the operating environment of the communications control device; (b) means for determining the environmental conditions in preference to the other communications control devices, in accordance with the actions of the user of the communications control device, when the operating environment indicates that the communications control device is a master communications control device having the right; (c) means for displaying environmental conditions transmitted by the other communications control devices to the user for his or her information, when the operating environment indicates that the communications control device is a master communications control device having the right; (d) means for transmitting environmental conditions reflecting the individual preferences of the user operating the communications control device to the master communications control device in accordance with the actions of the user, when the operating environment indicates that the communications control device is a slave communications control device which does not have the right; and (e) means for setting the environmental conditions determined by the master communications control device as the environmental conditions of the communications control device, regardless of whether or not the environmental conditions determined by the master communications control device in accordance with the actions of its user coincide with the environmental conditions reflecting the individual preferences of the user operating the slave communications control device.

In a communications control device which communicates with other communications control devices, the invention for achieving the second object comprises: (a) means for determining whether or not the communications control device has the right to determine environmental conditions affecting all the communications control devices jointly, in preference to the other communications control devices, on the basis of the operating environment of the communications control device; (b) means for displaying a cursor indicating the environmental conditions as desired by the user operating the communications control device, in accordance with the user's actions, when the communications control device is a slave communications control device which does not have the right; and (c) means for setting the environmental conditions of the device solely in accordance with the environmental conditions determined by the actions of the user operating the master communications control device having the right and transmitted by the master control device, regardless of the display state of the cursor.

In other words, the cursor displayed by the slave communications control device may be regarded as a "cursor without setting function", which can be used to make selections, but not to determine actual settings.

The invention for achieving the third object further comprises: (a) means for displaying environmental conditions transmitted by the slave communications control device, as well as the environmental conditions selected by the communications control device, when the communications control device is the master communications control device; (b) means for transmitting the environmental conditions selected by the communications control device to the slave communications control device; and (c) means for displaying environmental conditions transmitted by the master communications control device, as well as the environmental conditions selected by the communications control device, when the communications control device is the slave communications control device.

The invention for achieving the fourth object comprises: (a) means for setting the environmental conditions currently selected by the communications control device as the final environmental conditions, if the time taken to select the environmental conditions has reached a prescribed time limit, when the communications control device is the master communications control device; and (b) means for transmitting these final environmental conditions to the slave communications control devices.

The invention for achieving the fifth object comprises means for changing the processing conducted between the communications control devices, according to whether environmental conditions transmitted by the slave communications control device have been accepted or refused, when the communications control device is the master communications control device.

For example, if the communications control devices are game devices, bonus points may be awarded to the master communications control device if it accepts the conditions, and penalty points may be imposed on the master communications control device if it refuses the conditions.

Desirably, the operating environment should relate to whether or not the device is liable for the charges for the communications circuit. It is unfair if the device belonging to the user who is paying for the communications circuit does not have a preferential right to determine conditions.

Furthermore, desirably, a communications control device should display an image describing the details of the environmental conditions selected by that device.

Moreover, if there exist a plurality of environmental conditions, it is desirable if means are provided whereby the preferential right to determine the environmental conditions is transferred to a different communications control device in succession, each time the environmental conditions are changed.

Desirably, the present invention is applied to game devices comprising communications control devices according to the present invention, and the environmental conditions relate to initial conditions for a game.

The present invention is a mechanically readable recording medium for storing program data whereby a computer device is caused to implement the steps of: (a) determining whether or hot a device has the right to determine environmental conditions affecting the operation of all devices connected via a communications circuit jointly, in preference to the other devices, on the basis of the operating environment of that device; (b) determining the environmental conditions according to the actions of the user operating the communications control device in preference to the other communications control devices, when the operating environment indicates that the device is a master communications control device having the right; (c) displaying environmental conditions transmitted by other communications control devices to the user for his or her information, when the operating environment indicates that the device is a master communications control device having the right; (d) transmitting environmental conditions reflecting the individual preferences of the user in accordance with the actions of the user, to the master communications control device, when the operating environment indicates that the device is a slave communications control device which does not have the right; and (e) setting environmental conditions determined by the master communications control device as the environmental conditions for the device, regardless of whether or not the environmental conditions determined by the master communications control device according to the actions of its user coincide with the environmental conditions reflecting the individual preferences of the user operating the slave communications control device.

A "recording medium" is a entity whereby information (mainly digital data and programs,) can be recorded by a physical means of some kind, and it is able to cause a processing device, such as a computer, special processor, or the like, to implement prescribed functions. In brief, it should enable programs to be downloaded into a computer by some means or other, thereby causing the computer to execute prescribed functions. Examples of such a recording medium include: a floppy disk, a hard disk, magnetic tape, CD-ROM, DVD, ROM cartridge, RAM memory cartridge with battery back-up, flash memory cartridge, fixed RAM cartridge, or the like.

Data may also be transferred from a host computer via a wired or wireless communications circuit (public circuit, data circuit, satellite circuit, or the like). The Internet is included in this definition of recording media.

DESCRIPTION OF THE PREFERRED EMBODIMENTS

Next, a preferred mode for implementing the present invention is described with reference to the drawings. In this mode of implementation, a communications control system according to the present invention is applied to a games system.

(Description of the Composition)

Figure 1:
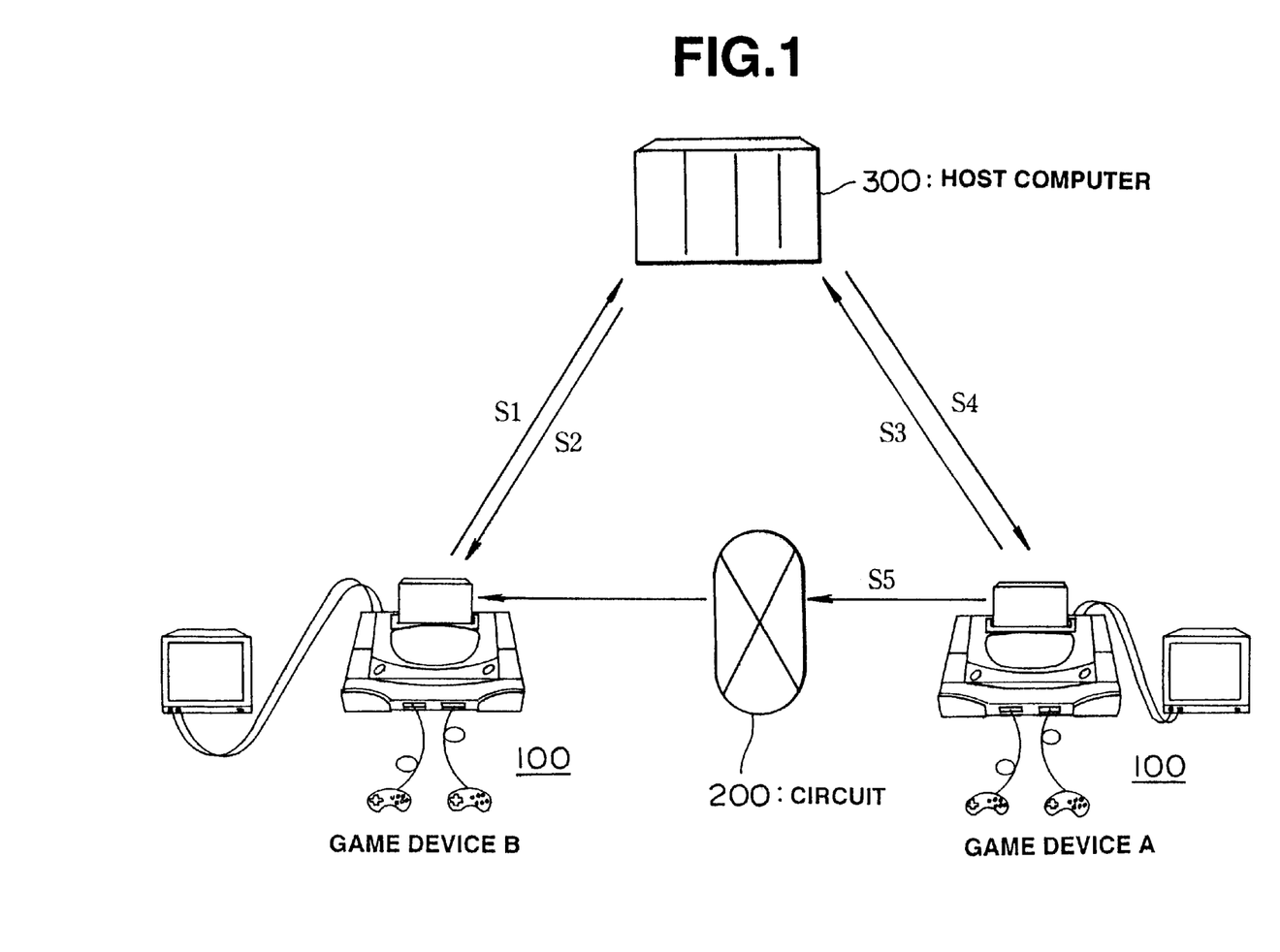
FIG. 1 is a general view of a game system according to a mode for implementing the present invention.

FIG. 1 shows a general view of a game system according to this mode of implementation. As the diagram shows, this game system comprises: game devices 100 (A and B) which form the communications control devices of the present invention, a circuit 200, such as a public telephone network, or the like, and a host computer 300.

The detailed composition of the game device 100 is described later. In this mode, game devices which conduct communications, in particular, are called game device A and B, respectively.

Since this game system conducts communications between remotely located game devices, generally, a public telephone network is used for the circuit 200. However, the present invention is not limited in terms of the type of circuit, and various types of circuit may be used. For example, a high-speed communications network, a special network, satellite communications, or the like, may be adopted. Furthermore, computer-to-computer communications by means of a cable connected independently between computers located in the same building, or communications by means of a LAN or CATV, are also possible.

The host computer 300 is composed such that it can control this communications-based game system. Provided that the host computer can implement control of computer information, there is no particular technological restriction on the computer's performance. As described later, the control implemented by the host computer involves intermediate processing whereby users wishing to play a game by communicating between game devices are introduced to their opponent for playing the game.

The game devices 100 are composed such that they can communicate via the circuit 200, and also be connected to the host computer 300. All communications are conducted via the circuit.

Figure 2:
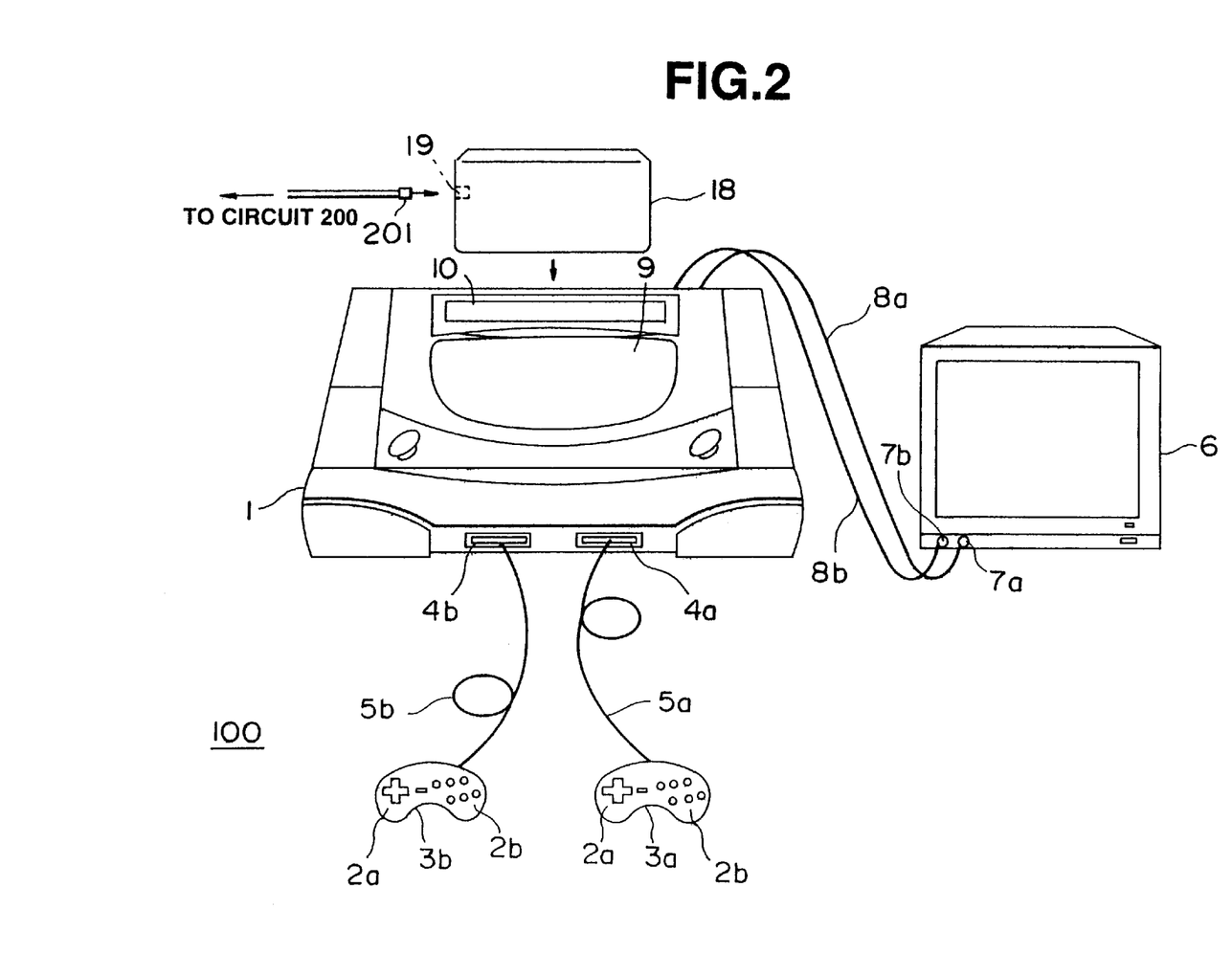
FIG. 2 is an external view of a game device according to this mode of implementation.

FIG. 2 shows an external view of a game device 100. As shown in the diagram, the game device 100 is composed such that pads 3a, 3b are connected via connectors 4a, 4b and cables 5a, 5b to a game device main unit 1. Furthermore, a modem unit 18 for communicating with the circuit 200 is provided detachably on a cartridge connecting section 10. A modular plug 201 can be connected removably to a modular jack 19 in the modem unit 18. A video cable 8a from a video input terminal 7a of a monitor device 6 and a sound cable 8b from a sound input terminal 7b thereof are connected respectively to a video output terminal and sound output terminal on the game device main unit 1, which are omitted for the diagram.

The pads 3a and 3b are input devices operated by users. The pads 3a and 3b are provided with a cross-shaped key 2a indicating direction, and a plurality of push buttons 2b. A recording medium CD-ROM 9 on which program data for implementing communications control according to the present invention is recorded is installed inside the game device main unit 1.

Figure 3:
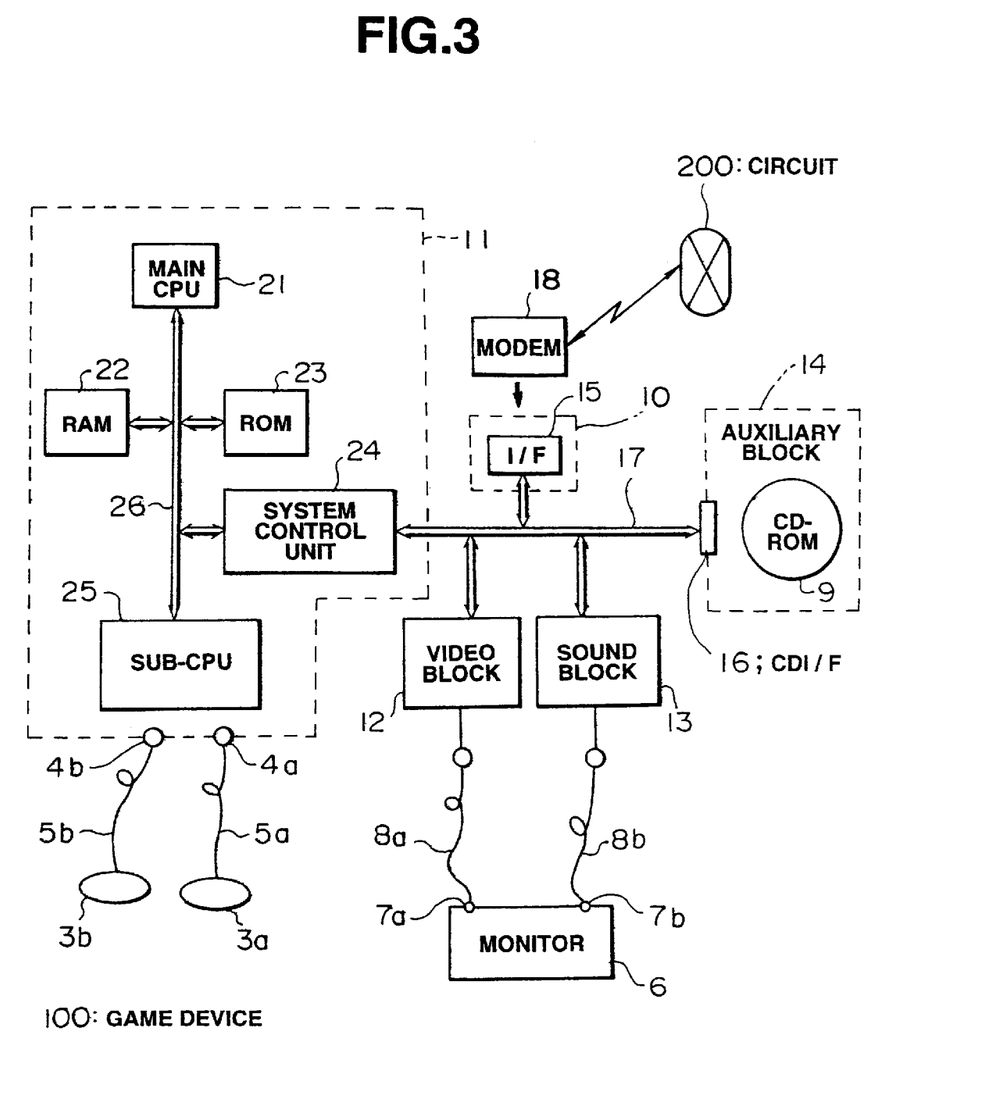
FIG. 3 is a block diagram according to this mode of implementation.

FIG. 3 shows a block diagram of a game device 100. The game device 100 is composed such that a cartridge connecting section 10, CPU block 11, video block 12, sound block 13 and auxiliary block 14 are mutually connected by means of a bus line 17.

A cartridge interface (hereinafter, abbreviated to I/F) 15 is provided in the cartridge connecting section 10. The modem unit 18 connected to this cartridge I/F 15 is electrically connected to the bus line 17, and it communicates with other game devices, or the like, by means of known communications procedures.

The CPU block 11 is constituted by a main CPU 21, RAM 22, ROM 23, system control unit 24 and sub-CPU 25, which are mutually connected by means of a bus line 26. The main CPU 21 reads program data from the CD-ROM 9 placed in the auxiliary block 14, in accordance with IP/L stored in the ROM 23, and stores this data in the RAM 22. The main CPU 21 is also composed such that it can process communications control according to the present invention, in accordance with the program data stored in the RAM 22. The RAM 22 stores program data and image data transferred from the CD-ROM 9, and also serves as a work area for the main CPU 21. IP/L and other program data, and polygon data are stored in the ROM 23. The system controller unit 24 controls data exchange between the bus line 26, which forms the system bus, and a bus line 26, which forms the external bus. The sub-CPU 25 controls the interface for data from pads 3a and 3b.

The video block 12 generates image data in accordance with polygon data and commands supplied from the CPU block 11, and outputs this data to the monitor device 6 via the video cable 3a.

The sound block 13 generates sound data in accordance with commands supplied from the CPU block 11, and output this sound to the monitor device 6 via a sound cable 8b.

The auxiliary block 14 is connected to the bus line 17 via the CD I/F 16. A CD-ROM 9 is installed in this auxiliary block 14, and data read out under the control of the CPU block 11 is transferred to the CPU block 11, or the like.

(Details of Game Play)

In a game device according to the present mode, a driving game is provided by means of the CPU block 11 implementing processing in accordance with program data. In this game, a car operated by the user (own car), a car operated by the user of a device chosen as an opponent for playing the game (opponent's car), and other cars driven according to the game program (other cars), are displayed on the monitor device 6. The players operate their own cars and compete for superiority in relation to the opponent's car, in particular. If the game is played between a plurality of game devices, then there exists data which must be shared between the devices. In a driving game as described here, this data may include the type of course on which the user's own car and the opponent's car are going to race, and weather conditions which will affect both cars. These are called environmental conditions, and they are determined by means of the processing described below.

(Description of Operation of Whole System)

Figure 4:
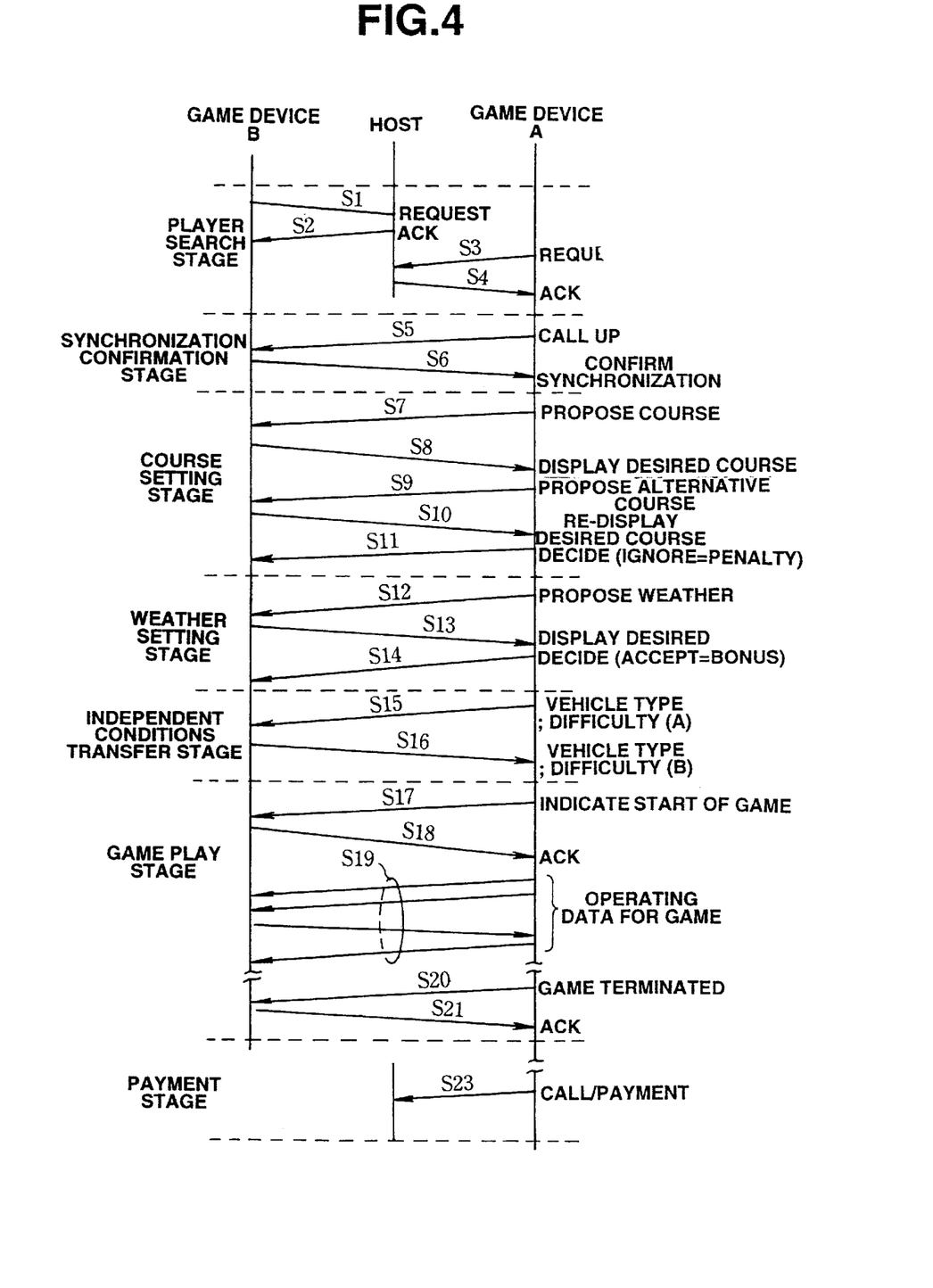
FIG. 4 is an example of a processing sequence in the game system as a whole according to this mode of implementation.

Next, the operation of the present mode of implementation will be described. FIG. 4 shows one example of a processing sequence in a game system as a whole according to the present mode of implementation. Below, each processing stage is described.

Player search stage: In this stage, a user operating a game device searches for a user to be an opponent in playing a game. This description also refers to FIG. 1. The sequential numbers (S1, etc.) in FIG. 1 correspond to the sequential numbers in FIG. 4.

Suppose that the user operating game device B in FIG. 1 wishes to play a game. This user operates a pad 3 (3a or 3b) on the game device 100 to call up the host computer 300 and registers a game request and conditions for this game (S1). A "game request" refers to an appeal for game opponents. The "conditions" refer to the type of game (in this mode, a driving game,) and the skill level, etc. Firstly, when the main CPU 21 in game device B determines that the operating data transferred from the pad 3 indicates a call to the host computer 300, the modem unit 18 calls the host computer 300 number. The game conditions selected by the user and the user's own subscriber telephone number are then transferred to the host computer 300 via the modem.

When the host computer 300 receives a call from game device B indicating that the user wishes to play a game, it stores the telephone number for game device B and the conditions indicated thereby. It then notifies game device B that has received an appeal for a game opponent, and it disconnects the circuit (S2). Game device B waits at standby until a game device providing an opponent is found.

Meanwhile, the user operating game device A thinks that he or she would like to play the same driving game, and calls up the host computer 300 to make a game request (S3). In this case, the host computer 300, reads in data relating to the game conditions from game device A and searches for a game device at standby which matches these conditions. If the conditions are not matched, the telephone number of game device A and the conditions indicated thereby are also recorded. Here, the conditions already indicated by game device B are the same as the conditions indicated by game device A. In this case, since game device B wishes to play the same game, the conditions coincide. Thereupon, the host computer 300 transmits the telephone number of game device B to game device A and disconnects the circuit (S4).

Synchronization confirmation stage: The user of game device A, to which the telephone number of game device B is transmitted, calls up the telephone number of this game device A using game device 100, again (S5). At game device A, the modem unit 18 establishes synchronization (S6). As a result, both game devices transfer to processing the game itself. If the game device detects that an irregularity has occurred in the circuit, the causes thereof are investigated and recorded, and if resetting is possible, the circuit is reset to a normal state once the irregularity has ceased.

Figure 6:
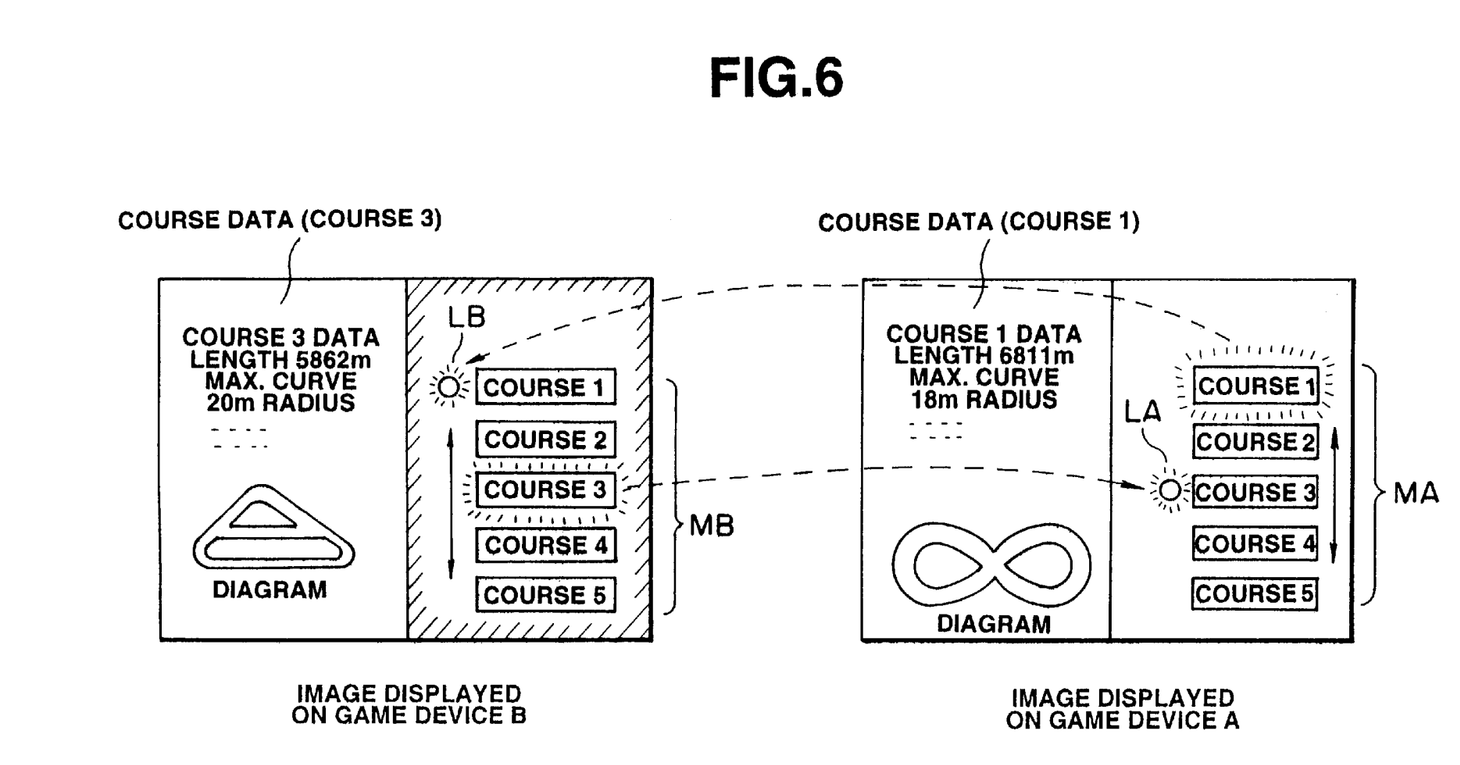
FIG. 6 shows examples of screen displays in game devices according to this mode of implementation.

Course setting stage: Steps S7–S16 correspond to the initial settings for the game. FIG. 6 shows an example of a screen display shown on the monitor device 6 of a game device. As this diagram illustrates, a menu bar (MA, MB) for selecting the type of course is shown on the right-hand half of the screen, and data for the course selected by the menu bar (MA, MB) is shown on the left-hand half of the screen.

The course can be selected freely in the direction indicated by the solid arrows shown in the diagram by operating the arrow keys 2a on the pad 3. For example, on the screen of game device A, course 1 is selected, and therefore a course map and data for course 1 is displayed on the left-hand half of the screen. On the screen of game device B, course 3 is selected, and therefore a course map and data for course 3 is displayed on the left-hand half of the screen.

Here, it is necessary to determine an order of priority. It is determined which of the game devices has the ultimate right to determine the environmental conditions, such as the course etc., in preference to the other devices. In the present mode, this is determined according to which game device is paying the circuit charges. Here, since game device A called up game device B, this means that game device A pays the circuit charges (telephone charges). Therefore, game device A is higher in the order of priority and it becomes the master device. On the other hand, game device B is lower in the order of priority and it becomes the slave device. A display corresponding to the order of priority is given in order to inform the user whether his or her device has a high or low priority. For example, as shown in FIG. 6, the display on the menu bar MB of game device B, which has a low priority, is darkened (indicated by diagonal hatching in the diagram).

The user of game device A (master) chooses a course by operating the menu bar MA. Information relating to the selected course is transmitted to game device B via the circuit 200. At game device B (slave), the course selected by game device A and transmitted via the circuit 200 is displayed. For example, in FIG. 6, game device B displays a light LB alongside the menu bar MB by the course selected by game device A, on the basis of information indicating that course 1 has been selected.

However, at game device B (slave), it is also possible to make a selection on the menu bar MB in the directions shown by the arrows in the diagram. This selection is transmitted to game device A as the environmental conditions desired by game device B, but the game device A has the right to decide whether or not to accept these wishes. In FIG. 6, course 3 is selected by game device B, so this information is transmitted to game device A. Based on this information, game device A displays a light LA alongside the menu bar by the course selected by game device B (S8). The fact that the selections in the two game devices are different means that the course setting desired by game device B is different to the course setting desired by game device A. Seeing this display, the user of game device A (master) is able to find out which course is desired by the user of game device B (slave). However, since game device A has the right to determine environmental conditions, such as the course setting, or the like, the user of game device A is able to set the course setting he or she desires, regardless of the display of lamp LA.

If the user of game device A, seeing the display of this lamp LA, considers that this desired course can be accepted, then it selects the item on the menu bar by which the light LA is lit. Here, game device A cannot accept this desired course, but it can accept another course (for example, course 4), and course 4 is selected (S9). This change in selection is transmitted directly to game device B, and the display is of light LB moves to course 4. If the user of game device B accepts this alternative proposal, then this user should change the selection on the menu bar MB to course 4. Here, it is supposed that the user makes no change and continues to select course 3 (S10). As long as the user does not change the menu bar selection, the light LA on game device A remains lit at a position alongside course 3. Game device A has a preferential right to determine conditions, as described above. If the user of game device A determines that an agreement cannot be reached in this situation, and he or she ignores the wishes of game device B and presses a prescribed setting button 2b on the pad 3, with course 4 still selected, then this becomes the final decision (S11). In other words, course 4 is set in game device A. Data indicating that the final decision is course 4 is transferred to game device B, and course 4 is set in game device B.

In this case, it is desirable if the details of processing are changed according to whether or not game device A accepts the wishes of game device B. For example, if it accepts the wishes of game device B, then bonus points are awarded to game device A, whilst if it does not accept the wishes of game device B, a penalty is imposed and points are deducted from game device A. This is in order to prevent game device A from abusing the right to determine environmental conditions, such as the course etc., by setting only conditions that are disadvantageous to game device B. Here, since game device A does not accept the wishes of game device B, penalty points are imposed.

Weather setting stage: The weather also affects both the user's own car and the opponent's car, and hence constitutes one of the environmental conditions. A similar exchange to that for course setting described above is conducted between the two game devices. Here, game device A has the preferential right to determine conditions. For example, game device A wants "clear" weather, and "clear" weather is selected on the menu bar. This is transmitted to game device A (S13), where it is displayed. The user of game device A decides whether or not to accept the weather settings desired by game device B. Here, if the user accepts the wishes of game device B, then game device A implements a final decision whilst "clear" weather remains selected (S14). Since the user has accepted the wishes of game device B, bonus points are awarded to game device A.

Independent conditions exchange stage: Independent conditions are conditions relating to a particular game device alone, and they do not affect the opponent's game device. Conceivable examples thereof include the type of car operated by the user, and the difficulty of operation relating to this car, and the like. Game device A transfers these independent conditions to game device B (S15). Game device B displays an opponent's car (car relating to the operations of game device A) on the basis of this information. Similarly, game device B also transfers independent conditions to game device A, which displays an opponent's car accordingly. These independent conditions can be determined separately. In other words, unlike the course setting and weather setting comprising the environmental conditions described above, game device B (slave) not only displays the conditions it desires, but is also able to determine its own final conditions independently. Each game device transmits its final conditions to the other device. Accordingly, the details set by a user for his or her own car are also reflected in the opponent's game device.

Game play stage: Game device A transmits a message indicating the start of the game (S17), and if there is a response to this (S18), then the game commences (S19). When the game is completed, game device A transmits this information to game device B (S20), and game device B acknowledges this information (S21). Usually, both game devices are disconnected from the circuit at the moment the game is completed. In this case, a communications completed state is recorded in a fixed RAM, or the like, in both game devices.

Payment stage: Payment is not actually made immediately after the game is completed. Rather, when the user wants to play a further game and calls up the host computer 300 again (S23), a payment process is implemented whereby the main CPU 21 in the game device 100 reads out the communications completed state from the previous connection from the aforementioned RAM etc., and an amount corresponding to the usage charge is deducted from a pre-paid card, or the like. No payment is made in cases where the communication was terminated due to unfair practice of some kind, or a communications fault.

(Description of the Operation of the Game Device)

Figure 5:
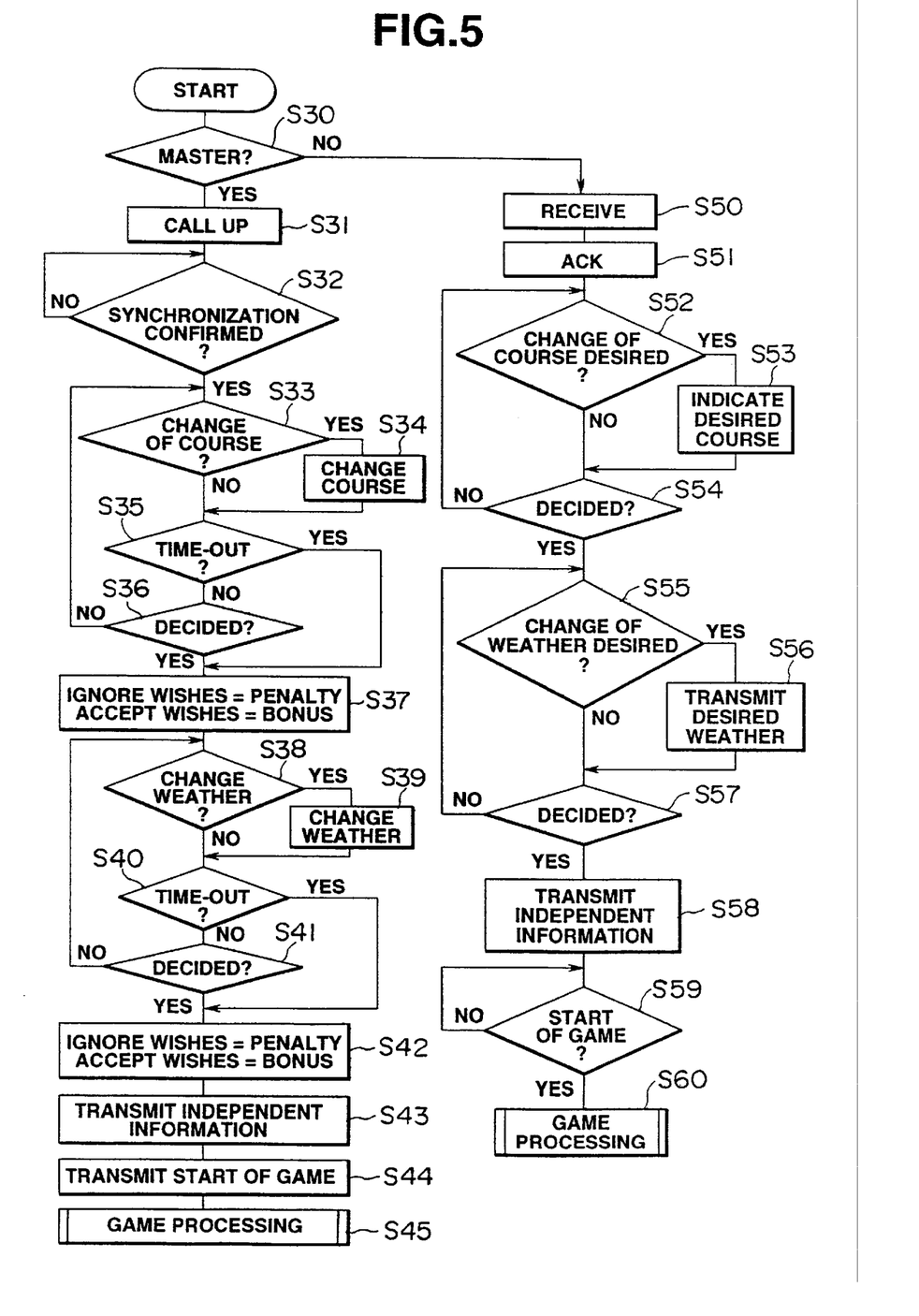
FIG. 5 is a flowchart describing the processing of each game device according to this mode of implementation.

FIG. 5 shows a flowchart describing the processing conducted in each game device, in other words, in each communications control device according to the present invention.

Firstly, after initialization, game device 100 determines whether it is a master device or slave device. This judgement is based on a search of its own operating environment. For example, the game device determines whether or not it is liable for the telephone charges, by referring to the progress of the processing sequence (S30).

If the game device determines that it is a master device (S30: YES), then it calls up a game device which is to be an opponent using a telephone number indicated by the host computer 300 via the circuit and the modem (S31). If synchronization can be established with the other game device 100 (S32; YES), then the game device transfers to environment setting.

If, on the other hand, the game device determines that it is a slave device (S30; NO), then it receives a call from the game device forming the master device (S50), and sends in return a response indicating that synchronization has been established (S51).

Thereupon, processing is conducted in a similar manner to that described in FIG. 4. In other words, when the game device is a master device, then if it changes the course setting from the initial setting (S33; YES), the course is changed (S34). The environmental conditions relating to this change of course are transmitted via the circuit to the slave game device. However, if the game device is a slave device (S30; NO), then it displays the course setting transmitted from the master game device via the circuit. If the user of the slave device wishes to set a different course to the displayed course setting (S52; YES), then the user selects his or her desired course. The slave game device then transmits the details of the course setting selected by its user to the master game device via the circuit (S53).

When the game device is a master device, if the time-out has not been reached (S35; NO) and the user does not want to make a final decision yet (S36; NO), then the course can be changed any number of times (S33–S35). If the time-out has been reached (S35; YES), or if the user has made a final decision (S36; YES), then game points are added or subtracted according to whether or not the user has accepted the course setting in the environmental conditions transmitted by the slave game device, in other words, the wishes of the user of the slave game device (S37). For example, if the course setting transmitted by the slave game device is ignored, then game points are deducted as a penalty. Conversely, if the course setting transmitted by the slave game device is accepted, then game points are added as a bonus.

The time-out processing mentioned above is important. When using a communications circuit, charges are incurred on the basis of time units or data volume. In cases where time-out processing is not implemented, if the user ponders over the selection, thereby taking a long time, the circuit charges will increase. In order to avoid this, the maximum time considered to be appropriate for the setting process is set as a time-out period, and when the time-out period has elapsed, it is appropriate for processing to be terminated.

If the game device is a slave device, then as long as no final decision is indicated (S54; NO), the device is able to transmit its wish to change the course (S52; S53). If the master game device transmits a final decision (S54; YES), then a course is set in the slave game device in accordance with the course setting determined and transmitted by the master game device, regardless of the course setting desired by the slave game device and transmitted to the master game device at step S53.

Similar processing is carried out when the environmental conditions involve weather setting. In other words, when the game device is a master device, then if the user wishes to change the weather (S38; YES), the weather in the game device is changed and the environmental condition relating to this changed weather setting is transmitted via the circuit to the slave game device (S39). However, when the game device is a slave device, then the weather setting transmitted from the master game device via the circuit is displayed. If the user desires different weather settings to the displayed weather settings (S55; YES), then the user selects his or her desired weather. This slave game device transmits the environmental conditions relating to the weather setting desired by the user to the master game device via the circuit (S56).

When the game device is a master device, then if the time-out has not been reached (S40; NO), and a final decision has not yet been made (S41; NO), the weather can be changed (S38–S40). If the time-out has been reached (S40; YES) or a final decision has been made (S41; YES), then points are added or deducted according to whether or not the wishes of the slave game device have been accommodated (S42). In other words, if the weather setting transmitted by the slave game device is ignored, then game points are deducted as a penalty. Conversely, if the weather setting transmitted by the slave game device is accepted, then bonus game points are awarded.

If the game device is a slave device, then as long as no final decision is indicated (S57; NO), the device is able to transmit its wish to change course (S55, S56). If environmental conditions representing a final decision are transmitted by the master game device (S57; YES), then the weather in the slave game device is set in accordance with the weather setting determined and transmitted by the master game device, regardless of the weather setting desired by the user of the slave game device, which was transmitted to, and displayed on, the master game device at step S56.

Finally, if the game device is a master device, it transmits independent information (S42), followed by information indicating the start of the game (S44), whereupon it moves to game processing (S45), initial setting having been completed. If the game device is a slave device, it transmits independent information (S58), whereupon it receives game start information from the master game device (S59; YES), and transfers to game processing (S60).

As described above, according to the present mode, even in an environment where it is not possible to obtain direct communication between users operating game devices for a game, or the like, played by communications, the details of each user's selection can be transmitted to the other party.

Moreover, even if a circuit which incurs a call charge is used, the right to determine conditions ultimately resides with the game device which is paying the call charges, and therefore that user is not disadvantaged. On the other hand, even a game device which does not have the right to determine conditions is able to display its own preferences, and therefore a sense of fairness can be maintained. Furthermore, data for the course to be selected is displayed, making the selection process convenient for the user.

(Other Modes of Implementation)

The present invention can be applied in a variety of ways besides the mode of implementation described above. For example, the present invention may be applied to a system, involving simulation devices, or the like, where the same conditions must be set in both devices, in circumstances where the users cannot communicate directly with each other. Furthermore, in a commercial game device, two sets of displays and input devices may be provided in a single device, and a contest may be held between users operating these respective sets. It is possible to apply the communications control technology according to the present invention to a device of this kind, also.

Furthermore, besides determining the operating conditions specifying whether the device is a master or slave device on the basis of the charge conditions, as described above, if there is a difference in status of some kind between the users, then the device operated by the person having the higher position in the order of priority can be assigned as the master device, accordingly.

Moreover, the details comprising the environmental conditions can be changed as appropriate in response to the details of the program. Examples of environmental condition items for different objects are shown in the table below.

| Object processed by device | Land vehicle (car, motorbike, railway, etc.) | Air vehicle (aeroplane, helicopter, etc.) | Marine vehicle (boat, submarine, etc.) |
|---|---|---|---|
| Environmental conditions | Type of course Weather Road surface, etc. | Weather Air density Direction and strength of wind, etc. | Weather (above water) Depth (below surface) Direction and strength of sea current, etc. |

Furthermore, in the mode of implementation described above, once set, the order of priority was not changed at any time, but the present invention may also be composed such that this order can be changed. In other words, if the game is a driving game, as described above, then whilst game device A has a preferential right to select the course, for the setting of the weather conditions, the preferential right may be transferred to game device B. By setting the program such that the preferential right changes alternately in this way, it is possible to conduct environment setting without creating a sense of unfairness.

In other words, if the user him or herself has the preferential right and ignores the wishes of the other party, making a compulsory final decision, then for the next item to be set the preferential right is transferred to the other party, and the user's own wishes are not considered. For this reason, an advantage is obtained in that the environmental settings can be expected to accommodate the wishes of both parties. Moreover, processing can be speeded up due to the fact that a preferential right exists. This is a particularly effective method for determining conditions in systems which do not contain disadvantageous factors, such as inequality in charges incurred.

According to the present invention, in cases where there exist environmental conditions which affect the operation of both communications control devices jointly, these conditions can be determined in a rational manner. In other words, a slave communications control device is able to transmit the environmental conditions selected by the user of the slave device to a master communications control device for the consideration of the master device, but ultimately, the environmental conditions determined by the master communications control device must be set as the environmental conditions of the slave device, regardless of whether or not these coincide with the environmental conditions desired by the user of the slave device.

Furthermore, according to the present invention, by means of the communications control devices transmitting their selections for environmental conditions to each other, it is possible for the slave communications control device to convey its desired selections to the master communications control device. The master communications control device is able to refer to the selection made by the slave communications control device and to transmit its final decision.

According to the present invention, since a so-called "time-out" function is provided, it is possible to proceed with setting efficiently.

According to the present invention, the details of processing change according to whether or not the master communications control device accommodates the wishes of the slave communications control device. Therefore, if the processing conducted when these wishes are accommodated is set such that it is advantageous to the master communications control device compared to the processing conducted when these wishes are not accommodated, then a sense of fairness between the devices can be maintained.

According to the present invention, by setting the operating environment in relation to whether or not a device is liable to pay for the communications circuit, it is possible to eliminate any sense of unfairness on the part of the person paying for the communications circuit.

According to the present invention, a communications control device displays an image indicating the details of environmental conditions selected by the user of that device. Thereby, it is possible for the user of the communications control device to make his or her selection in a convenient manner.

According to the present invention, since the preferential right to determine environmental conditions is transferred, it becomes less likely that environmental conditions will be decided which ignore the selection made by the other party, and therefore it can be expected that reasonable decisions will be made.

What is claimed is:

1. A communications control system for conducting communications between a plurality of communications control devices comprising:

a master communications control device which has the right to determine environmental conditions affecting the operations of all the communications control devices jointly, in preference to the other communications control devices, in accordance with the actions of a user operating this master communications control device, and which displays the environmental conditions transmitted by the other communications control devices to the user for his or her information; and a slave communications control device, which communicates with said master communications control device, transmits environmental conditions reflecting the individual preferences of the user operating that slave communications control device in accordance with that user's actions, to the master communications control device, and sets the environmental conditions determined by said master communications control device as its own environmental conditions, regardless of whether or not the environmental conditions determined by the master communications control device in accordance with the actions of its user coincide with the environmental conditions reflecting the individual preferences of the user operating this slave communications control device.

2. A communications control device which communicates with other communications control devices, comprising:

means for determining whether or not said communications control device has the right to determine environmental conditions affecting all the communications control devices jointly, in preference to the other communications control devices, on the basis of the operating environment of said communications control device;

means for determining said environmental conditions in preference to the other communications control devices, in accordance with the actions of the user of said communications control device, when said operating environment indicates that the communications control device is a master communications control device having said right;

means for displaying environmental conditions transmitted by the other communications control devices to the user for his or her information, when said operating environment indicates that the communications control device is a master communications control device having said right;

means for transmitting environmental conditions reflecting the individual preferences of the user operating said communications control device to the master communications control device in accordance with the actions of said user, when said operating environment indicates that the communications control device is a slave communications control device which does not have said right; and means for setting the environmental conditions determined by said master communications control device as the environmental conditions of the communications control device, regardless of whether or not the environmental conditions determined by said master communications control device in accordance with the actions of its user coincide with the environmental conditions reflecting the individual preferences of the user operating said slave communications control device.

3. A communications control device which communicates with other communications control devices comprising:

means for determining whether or not said communications control device has the right to determine environmental conditions affecting all the communications control devices jointly, in preference to the other communications control devices, on the basis of the operating environment of said communications control device;

means for displaying a cursor indicating said environmental conditions as desired by the user operating said communications control device, in accordance with said user's actions, when said communications control device is a slave communications control device which does not have said right; and means for setting the environmental conditions of said device solely in accordance with the environmental conditions determined by the actions of the user operating the master communications control device having said right and transmitted by said master control device, regardless of the display state of said cursor.

4. The communications control device according to claim 2, further comprising means for displaying environmental conditions transmitted by said slave communications control device, as well as the environmental conditions selected by said communications control device, when said communications control device is said master communications control device; means for transmitting said environmental conditions selected by said communications control device to said slave communications control device; and means for displaying environmental conditions transmitted by said master communications control device, as well as the environmental conditions selected by said communications control device, when said communications control device is said slave communications control device.

5. The communications control device according to claim 2, comprising means for setting the environmental conditions currently selected by said communications control device as the final environmental conditions, if the time taken to select said environmental conditions has reached a prescribed time limit, when said communications control device is said master communications control device; and means for transmitting these final environmental conditions to the slave communications control devices.

6. The communications control device according to claim 2, comprising means for changing the processing conducted between the communications control devices, according to whether environmental conditions transmitted by said slave communications control device have been accepted or refused, when the communications control device is said master communications control device.

7. The communications control device according to claim 2, wherein said operating environment relates to whether or not said device is liable for the charges for the communications circuit.

8. The communications control device according to claim 2, wherein said communications control device displays an image describing the details of the environmental conditions selected by that device.

9. The communications control device according to claim 2, wherein, if there exist a plurality of environmental conditions, means are provided whereby the preferential right to determine said environmental conditions is transferred to a different communications control device in succession, each time the environmental conditions are changed.

10. The game device comprising the communications control device according to any one of claims 2 to 8, wherein said environmental conditions relate to initial conditions for a game.

11. A mechanically readable recording medium for storing program data whereby a computer device is caused to implement the steps of:

determining whether or not a device has the right to determine environmental conditions affecting the operation of all devices connected via a communications circuit jointly, in preference to the other devices, on the basis of the operating environment of that device;

determining said environmental conditions according to the actions of the user operating said communications control device in preference to the other communications control devices, when said operating environment indicates that said device is a master communications control device having said right;

displaying environmental conditions transmitted by other communications control devices to the user for his or her information, when said operating environment indicates that said device is a master communications control device having said right;

transmitting environmental conditions reflecting the individual preferences of the user in accordance with the actions of said user, to the master communications control device, when said operating environment indicates that said device is a slave communications control device which does not have said right; and setting environmental conditions determined by said master communications control device as the environmental conditions for said device, regardless of whether or not the environmental conditions determined by said master communications control device according to the actions of its user coincide with the environmental conditions reflecting the individual preferences of the user operating said slave communications control device.

\* \* \* \* \*